US011897112B2

(12) United States Patent
Swaminathan et al.

(10) Patent No.: US 11,897,112 B2
(45) Date of Patent: Feb. 13, 2024

(54) POWER TOOL WITH FAN DUCT FOR PRINTED CIRCUIT BOARD

(71) Applicant: Ingersoll-Rand Industrial U.S., Inc., Davidson, NC (US)

(72) Inventors: Vairavasundaram Swaminathan, Bangalore (IN); Scott Turner, Jackson Springs, NC (US); William Durham, Statesville, NC (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 447 days.

(21) Appl. No.: 17/087,790

(22) Filed: Nov. 3, 2020

(65) Prior Publication Data

US 2022/0134529 A1 May 5, 2022

(51) Int. Cl.
*B25F 5/00* (2006.01)
*B25B 21/00* (2006.01)
*B25B 23/00* (2006.01)

(52) U.S. Cl.
CPC .............. *B25F 5/008* (2013.01); *B25B 21/00* (2013.01); *B25B 23/0078* (2013.01)

(58) Field of Classification Search
CPC ............. B25F 5/00; B25F 5/008; H02K 11/33
USPC .......................................................... 173/197
See application file for complete search history.

(56) References Cited

U.S. PATENT DOCUMENTS 7,786,627 B2 8/2010 Riedl
2005/0202310 A1 9/2005 Yahnker et al.
2013/0255981 A1 10/2013 Noto et al.
2015/0256111 A1* 9/2015 Forster ....................... H02P 6/14 318/400.27
2017/0361416 A1* 12/2017 Lutz ........................ B25F 5/008
2021/0028671 A1* 1/2021 Chung .................. H02K 11/33

FOREIGN PATENT DOCUMENTS

DE 4420530 A1 12/1995
DE 102006038756 * 2/2008 ................ B25F 5/00
DE 102006038756 A1 2/2008
DE 102007000290 * 11/2008 ................ B25F 5/00
(Continued)

OTHER PUBLICATIONS

Extended European Search Reported for Application No. 21204896.1, dated Apr. 12, 2022.

*Primary Examiner* — Jacob A Smith
(74) *Attorney, Agent, or Firm* — Kevin E. West; Advent, LLP

(57) ABSTRACT

A cooling assembly for a power tool includes an air mover configured to be disposed within a housing assembly at a first end of a generally longitudinal enclosure proximate to a handle enclosure. The air mover is configured to direct air into the housing assembly and then generally perpendicularly to a longitudinally extending direction of the generally longitudinal enclosure. The cooling assembly also includes a duct configured to connect to the air mover and be in fluid communication with the air mover to direct air into the handle enclosure. The duct includes an inflow segment defining a first area for receiving the air from the air mover, an outflow segment defining a second area for directing the air from the air mover into the handle enclosure, and a connecting segment connecting the inflow segment to the outflow segment.

5 Claims, 9 Drawing Sheets

(56) References Cited

FOREIGN PATENT DOCUMENTS

| | | | |
|---|---|---|---|
| DE | 102007000290 | A1 | 11/2008 |
| EP | 1302281 | A1 | 4/2003 |
| GB | 2423420 | A | 8/2006 |

* cited by examiner

POWER TOOL WITH FAN DUCT FOR PRINTED CIRCUIT BOARD

BACKGROUND

Power tools are tools that are actuated by a power source or mechanism other than power supplied by the hands of an operator. Power tools are often powered electrically, e.g., by battery, by a corded connection to AC mains, and so forth. Many power tools use electric motors. Power tools can also be powered pneumatically and with other power sources, such as internal combustion engines.

DRAWINGS

The Detailed Description is described with reference to the accompanying figures. The use of the same reference numbers in different instances in the description and the figures may indicate similar or identical items.

DETAILED DESCRIPTION

Figure 1:
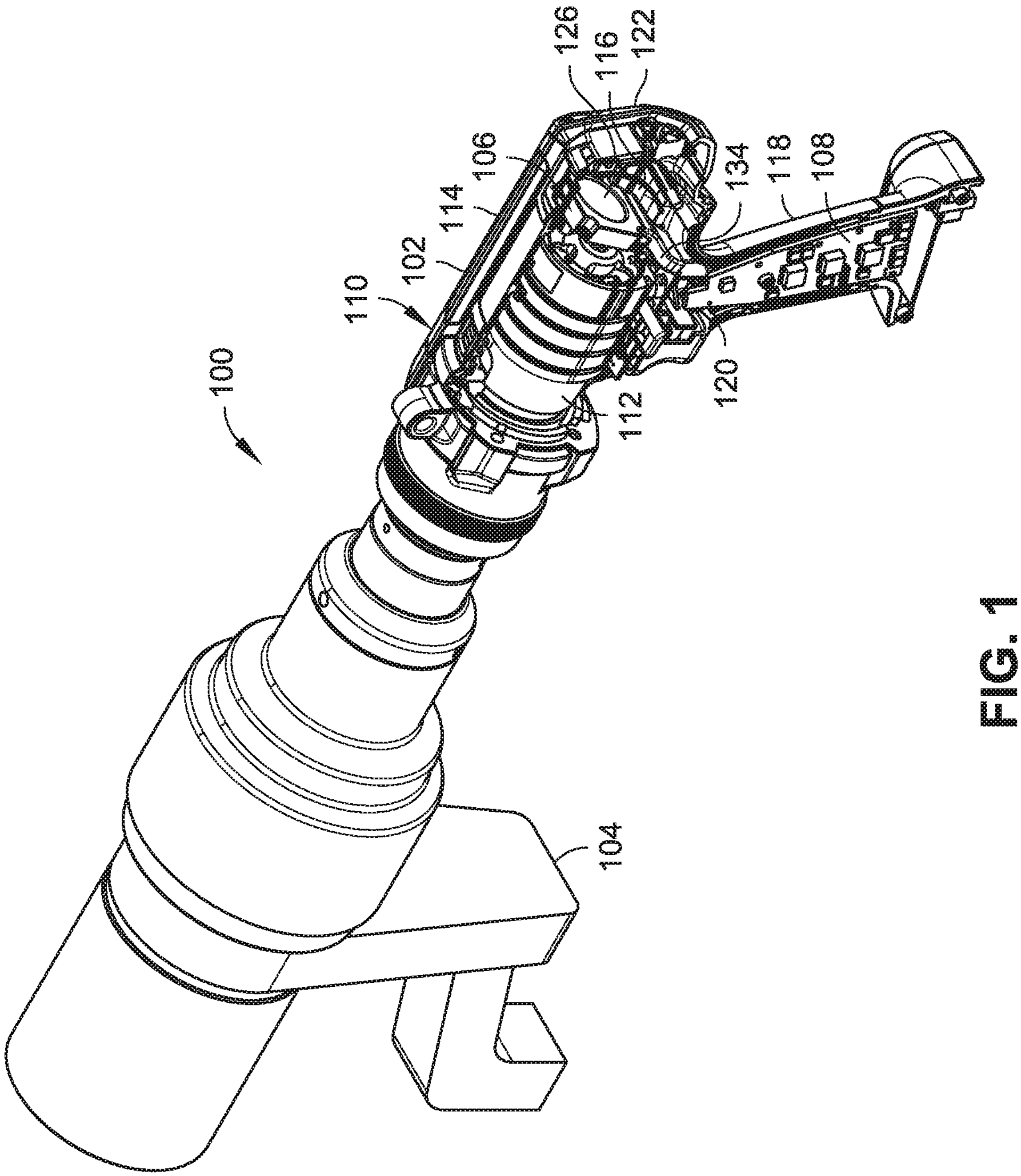
FIG. 1 is a partial isometric view illustrating a power tool including a cooling assembly in accordance with example embodiments of the present disclosure.
Figure 2:
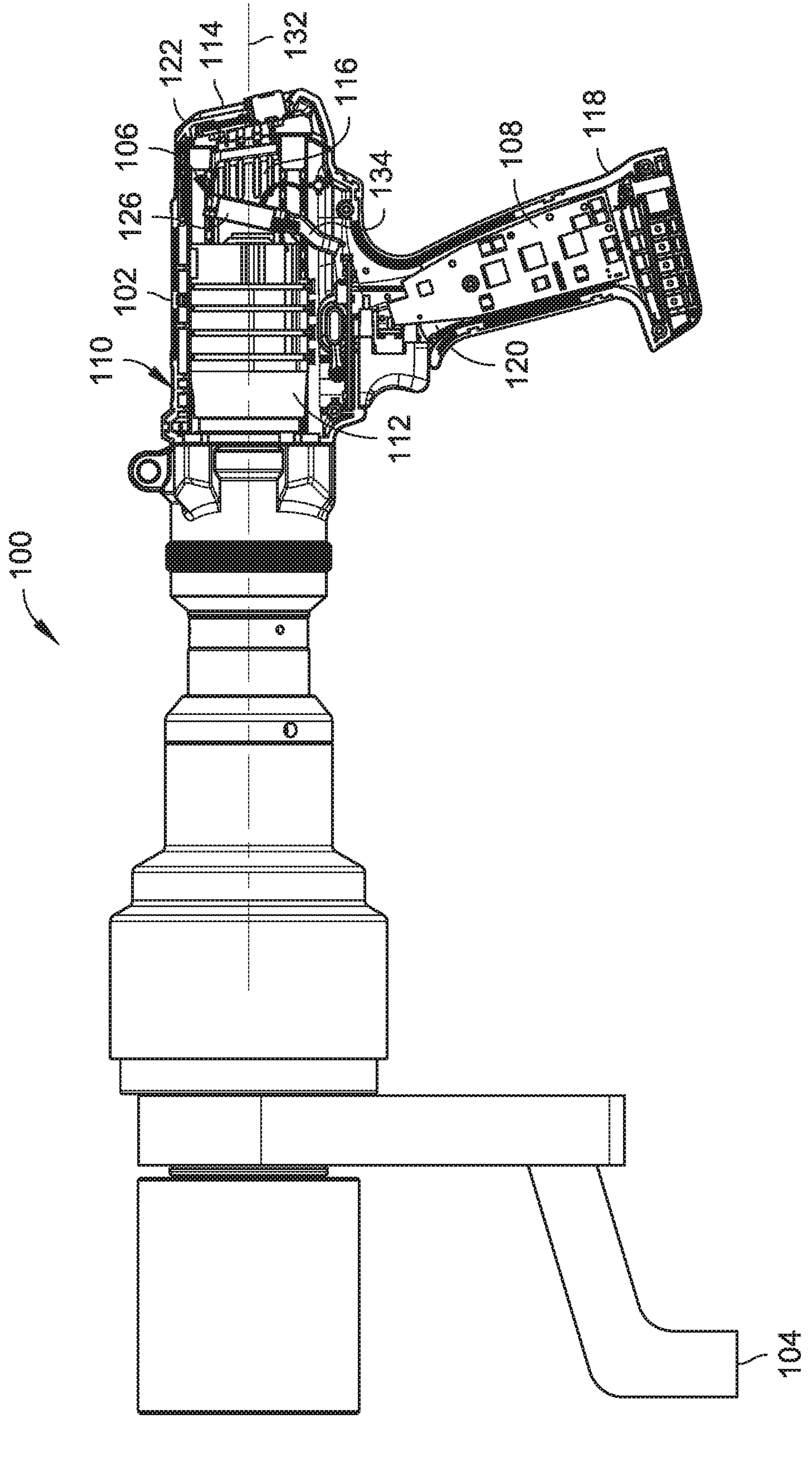
FIG. 2 is a partial side view of the power tool illustrated in FIG. 1.

Referring generally to FIGS. 1 through 13, power tools 100 are described in accordance with example embodiments of the present disclosure. In some embodiments, a power tool 100 is a high torque power tool, such as a torque wrench or nutrunner 102 connectable to, for example, a reaction device, such as a reaction arm 104. As described herein, the nutrunner 102 has a small form factor for its available power, e.g., to facilitate portability. For example, the nutrunner 102 provides high torque operation with a portable form factor using a planetary torque multiplier or gearbox with continuous gearing. However, a nutrunner 102 is provided by way of example and is not meant to limit the present disclosure. In other embodiments, a power tool 100 can be another type of tool, including, but not necessarily limited to, another high torque power tool, such as an impact tool (e.g., an impact wrench), a grinder tool, and so forth.

In embodiments of the disclosure, a power tool 100, such as the nutrunner 102, is electrically powered (e.g., corded and/or cordless) and includes one or more printed circuit boards (PCBs) for controlling the delivery of electrical energy to various components of the power tool 100. These power circuit boards generate heat during operation. For example, the nutrunner 102 is a forty-volt (40V) tool that switches up to about forty amperes (40 A) of current to deliver between about four thousand and six thousand Newton-meters (Nm) of torque. The heat generation of PCBs and/or other components in a power tool 100 can restrict the duty cycle of the power tool 100, which can, in turn, affect the productivity of its operator. For instance, operation of a power tool 100 may be stopped when a temperature measured within the tool reaches or exceeds about eighty degree Celsius (80° C.). The systems, techniques, and apparatus described herein facilitate management of heat generation and/or facilitate heat dissipation from power circuit boards and/or other components of a power tool 100.

A power tool 100 includes a cooling assembly 106 for cooling electrical circuitry 108 contained within a housing assembly 110 of the power tool 100. In embodiments of the disclosure, the power tool 100 includes an electrically powerable drive unit (e.g., a motor 112 and/or another drive unit) and the circuitry 108 for controlling a supply of electrical energy to the drive unit or motor 112. The circuitry can include, for instance, one or more insulated gate field effect transistors 152. In some embodiments, the electrical energy is supplied through the circuitry 108 from a battery, e.g., from a rechargeable battery connectable to the power tool 100. In some embodiments, the electrical energy is supplied from an external power supply, e.g., from AC mains via a corded connection. However, these energy sources are provided by way of example and are not meant to limit the present disclosure. In other embodiments, a power tool 100 can be powered using one or more other energy sources.

The housing assembly 112 of the power tool 100 has a generally longitudinal enclosure 114 with a first interior volume 116 for containing the motor 112, and a handle enclosure 118 with a second interior volume 120 for containing the circuitry 108. In embodiments of the disclosure, the handle enclosure 118 extends generally perpendicularly with respect to the generally longitudinal enclosure 114 proximate to a first end 122 of the generally longitudinal enclosure 114. As described herein, the second interior volume 120 of the handle enclosure 118 is in fluid communication with the first interior volume 116 of the generally longitudinal enclosure 114. For example, the first interior volume 116 is immediately adjacent to the second interior volume 120 at an interface 124 between the generally longitudinal enclosure 114 and the handle enclosure 118. In some embodiments, the housing assembly 112 is formed as two halves of a shell, where each shell half includes one-half of the generally longitudinal enclosure 114 and one-half of the handle enclosure 118 together as a unitary piece. However, this shell arrangement is provided by way of example and is not meant to limit the present disclosure. In other embodiments, the housing assembly 112 can be formed using more than two pieces, such as individual halves for each of the generally longitudinal enclosure 114 and the handle enclosure 118 that are connectable together.

The cooling assembly 106 of the power tool 100 includes an air mover, e.g., a fan 126, disposed within the housing assembly 112 at the first end 122 of the generally longitudinal enclosure 114 proximate to the handle enclosure 118. In embodiments of the disclosure, the fan 126 is configured to direct air from outside of the housing assembly 112 at the first end 122 into the housing assembly 112. For example, the generally longitudinal enclosure 114 includes one or more apertures, slots, or vents 128 defined in the end and/or one or more sides 130 of the generally longitudinal enclosure 114 proximate to the first end 122. The fan 126 is configured to direct (e.g., blow) the air generally perpendicularly to a longitudinally extending direction of the generally longitudinal enclosure 114. For instance, an axis of rotation 132 of the motor 112 extends in the longitudinally extending direction of the enclosure, and the fan 126 is configured to direct the air from outside of the housing assembly 112 through the vents 128 and generally perpendicularly (e.g., radially) with respect to the axis of the rotation of the motor 112. In some embodiments, the fan 126 is a centrifugal fan, e.g., having axial inflow and radial outflow.

As described, the fan 126 is located behind the motor 112 and away from the circuitry 108, e.g., due to size restrictions on the power tool 100 and/or ergonomic considerations for the handle enclosure 118. Such position and spacing constraints may limit the effectiveness of the fan 126 in directing air to the circuitry 108 and cooling, for example, power PCBs. In addition, a circuitous path traversed by the air from the fan 126 to the circuitry 108 may create undesirable airflow turbulence, which can further limit the cooling efficiency of the fan 126. In embodiments of the disclosure, the cooling assembly 106 of the power tool 100 includes a duct 134 adjacent to and in fluid communication with the fan 126 at the first end 122 of the generally longitudinal enclosure 114. Together, the fan 126 and the duct 134 form a cooling assembly 106 for cooling the electrical circuitry 108 contained within the handle enclosure 118 of the power tool 100.

The duct 134 is configured to direct the air from the fan 126 into the handle enclosure 118 and toward the circuitry 108. For example, the duct 134 captures circumferential airflow from the fan 126. In embodiments of the disclosure, the duct 134 gradually narrows the airflow from the fan 126 while directing the airflow toward the circuitry 108. By focusing and directing the airflow in this manner, components such as the circuitry 108 of the power tool 100 are more effectively and more efficiently cooled, allowing the power tool 100 to be operated for a longer duration of time, improving the duty cycle of the power tool 100 and productivity for the operator of the power tool 100. Additionally, in the case of power PCBs for instance, the lifespan of the PCBs may be increased, decreasing maintenance associated with the power tool 100. Further, by using the duct 134 to direct the airflow rather than relying solely on the housing assembly 112, the small form factor and ergonomic arrangement of the housing assembly 112 can be maintained.

Referring now to FIGS. 5 through 13, the duct 134 includes an inflow segment 136 defining a first area 138 for receiving air from the air mover or fan 126 and an outflow segment 140 defining a second area 142 for directing the air from the fan 126 toward the circuitry 108. The duct 134 also includes a connecting segment 144 for connecting the inflow segment 136 to the outflow segment 140. In some embodiments, the first area 138 of the inflow segment 136 is generally parallel to the second area 142 of the outflow segment 140. However, the first area 138 of the inflow segment 136 is not necessarily parallel to the second area 142 of the outflow segment 140. For example, the first area 138 of the inflow segment 136 can be angled with respect to the second area 142 of the outflow segment 140. In some embodiments, the first area 138 of the inflow segment 136 is axially offset from the second area 142 of the outflow segment 140 by the connecting segment 144. For example, the inflow segment 136 has a first direction of flow or first axis 146, the outflow segment 140 has a second direction of flow or second axis 148, and the connecting segment 144 has a third direction of flow or third axis 150 angled between the first axis 146 and the second axis 148.

Figure 12:
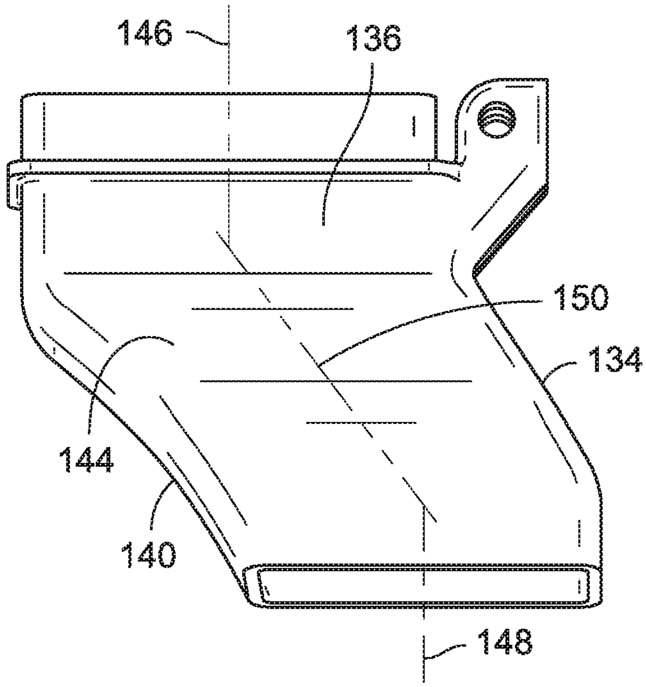
FIG. 12 is a front elevation view of the duct illustrated in FIG. 5.
Figure 13:
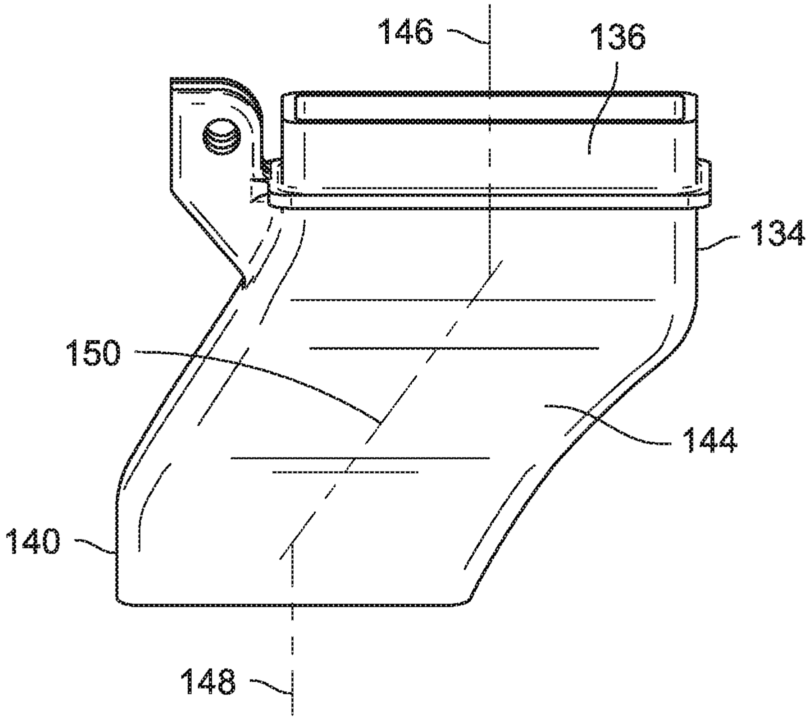
FIG. 13 is a rear elevation view of the duct illustrated in FIG. 5.

As described with reference to FIGS. 10 through 13, in some embodiments one or more of the first area 138 and/or the second area 142 can be generally rectangular-shaped, and the third axis 150 can be angled with respect to both the first axis 146 and the second axis 148 when viewed from an orientation facing a short side of a rectangular-shaped area (FIGS. 10 and 11) and when viewed from an orientation facing a long side of a rectangular-shaped area (FIGS. 12 and 13). However, the first area 138 of the inflow segment 136 is not necessarily axially offset from the second area 142 of the outflow segment 140 by the connecting segment 144. In some embodiments, the third axis 150 is not angled with respect to the first axis 146 and the second axis 148 when viewed from the orientation facing the short side of the rectangular-shaped areas. In some embodiments, the third axis 150 is not angled with respect to the first axis 146 and the second axis 148 when viewed from the orientation facing the long side of the rectangular-shaped areas. In some embodiments, the first area 138 and/or the second area 142 are not necessarily rectangular-shaped. For example, the first area 138 may be rectangular-shaped and may transition to a rounded (e.g., circular, elliptical) second area 142. In some embodiments, the first area 138 transitions to a differently shaped second area 142 via a swept blend geometry (e.g., transitioning through the connecting segment 144).

In embodiments of the disclosure, the second area 142 of the outflow segment 140 is less than the first area 138 of the inflow segment 136. For example, in some embodiments a ratio of the second area 142 of the outflow segment 140 to the first area 138 of the inflow segment 136 is about seventy-one one-hundredths (0.71). However, this ratio is provided by way of example only and is not meant to limit the present disclosure. In other embodiments, a ratio of the second area 142 of the outflow segment 140 to the first area 138 of the inflow segment 136 can range from about one-half (0.5) to about ninety-five one-hundredths (0.95). For example, the ratio can range from 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95 to about 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95.

As described, the duct 134 gradually narrows the airflow from the fan 126 while directing the airflow toward the circuitry 108. For example, the connecting segment 144 tapers from the inflow segment 136 to the outflow segment 140. In some embodiments, the duct 134 is formed using an additive manufacturing process, which causes the interior of the duct 134 to be free from obstructions. For example, the duct 134 is formed using a 3D printer that enables complex shapes that would not otherwise be possible without leaving residual obstructions, such as seams (e.g., as a product of a multi-part arrangement, such as multiple injection-molded pieces) and/or tooling marks (e.g., as a product of machining a workpiece). In some embodiments, the duct 134 can be formed using a glass-filled nylon blend material printed using an inkjet array that selectively applies fusing and detailing agents across a bed of nylon powder. The fusing and detailing agents are fused by heating elements into a solid layer. After each layer is deposited and selectively fused, another layer is deposited until the duct 134 is formed. Then, loose powder can be removed from the duct 134, leaving an unobstructed surface, even on the interior of the duct 134. However, it should be noted that nylon material is provided by way of example and is not meant to limit the present disclosure. In other embodiments, the duct 134 can be formed (e.g., 3D printed) using other materials, including, but not necessarily limited to: plastic materials (e.g., acrylonitrile butadiene styrene (ABS) material, polylactic acid (PLA) material), resin materials, and so forth.

Figure 3:
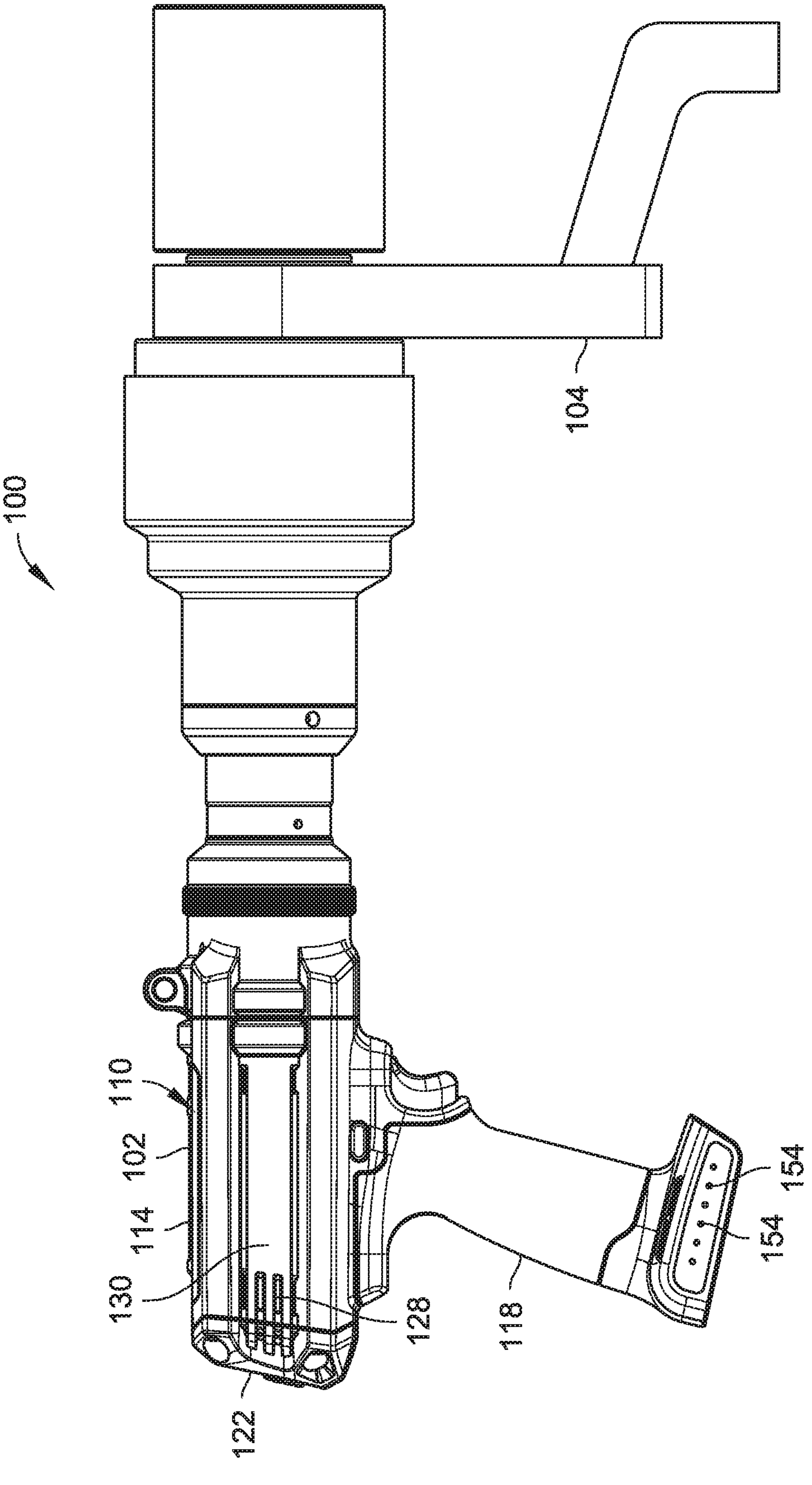
FIG. 3 is a side view of the power tool illustrated in FIG. 1.
Figure 4:
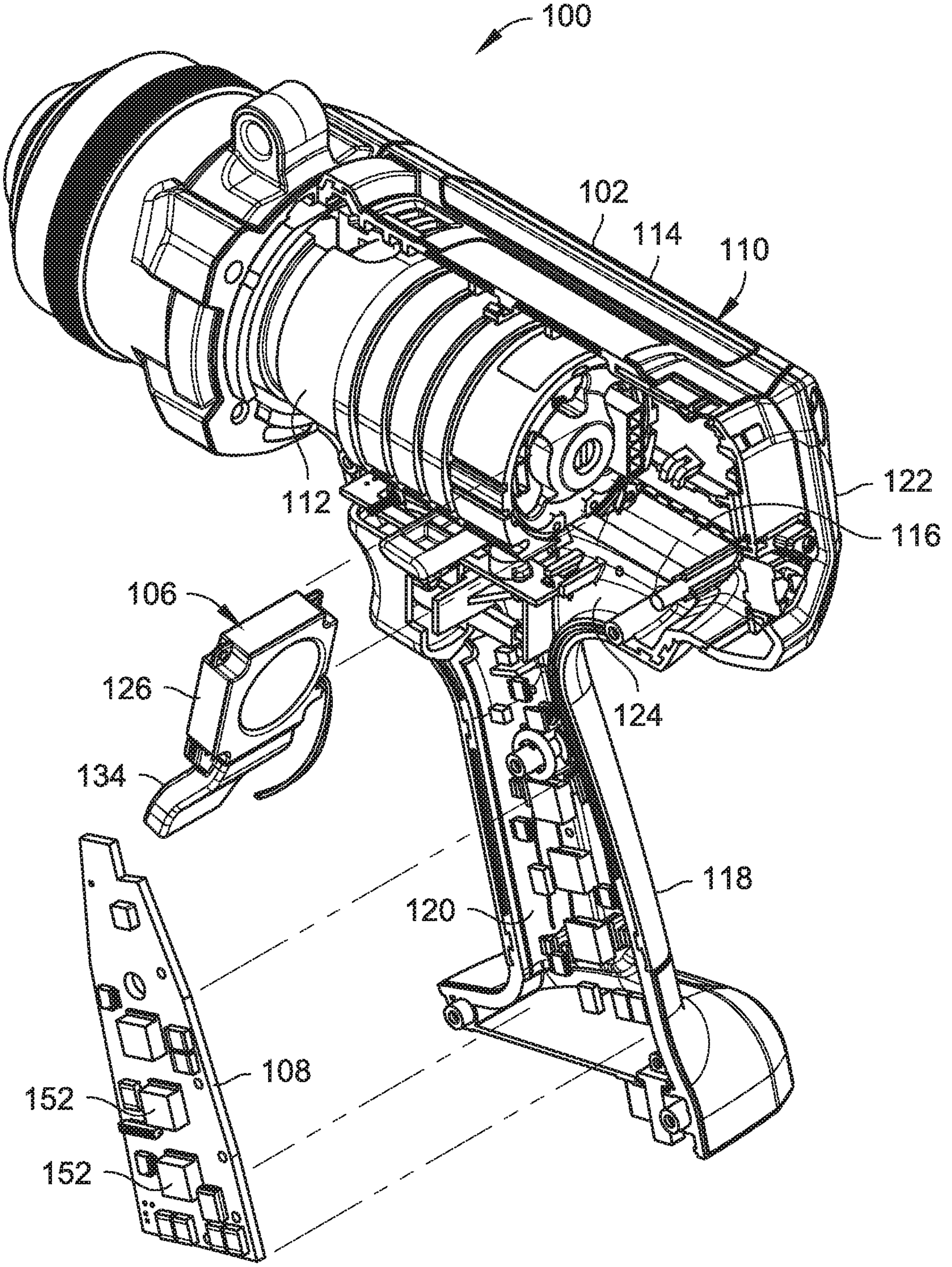
FIG. 4 is a partial exploded isometric view of the power tool illustrated in FIG. 1.
Figure 5:
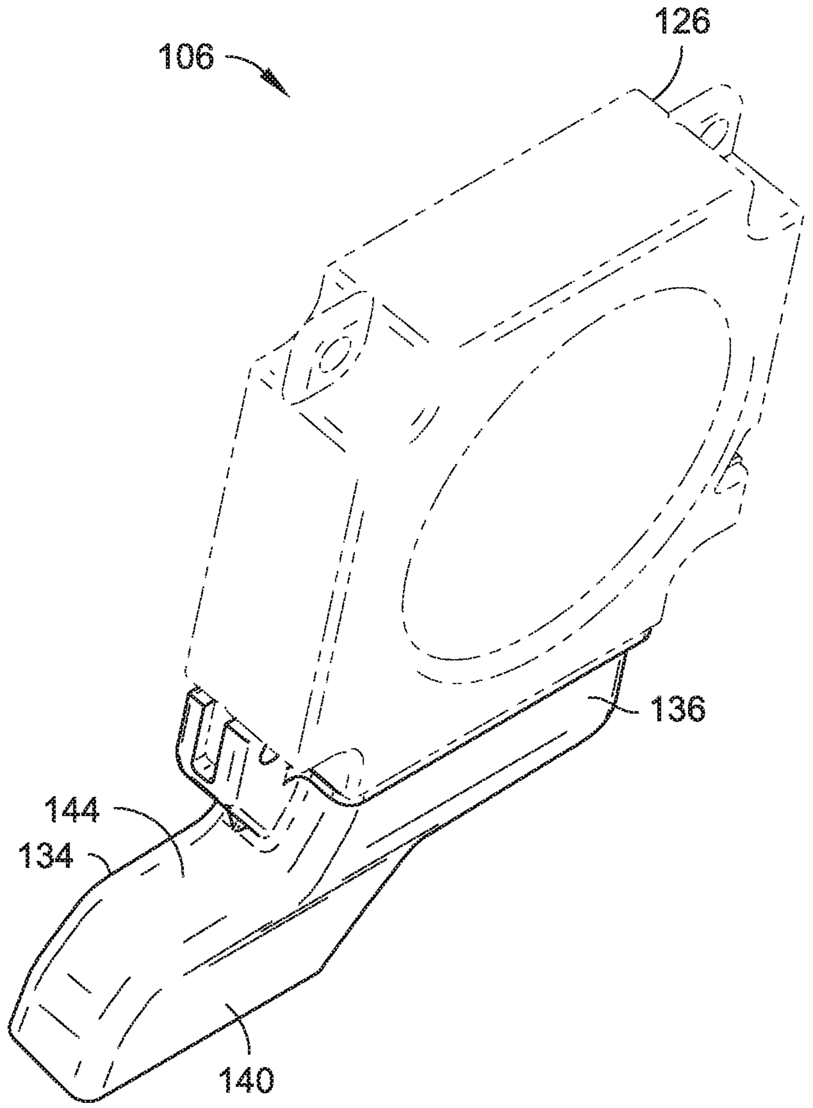
FIG. 5 is an isometric view illustrating a cooling assembly for a power tool, such as the power tool illustrated in FIG. 1, where the cooling assembly includes a fan and a 3D printed duct in accordance with example embodiments of the present disclosure.
Figure 6:
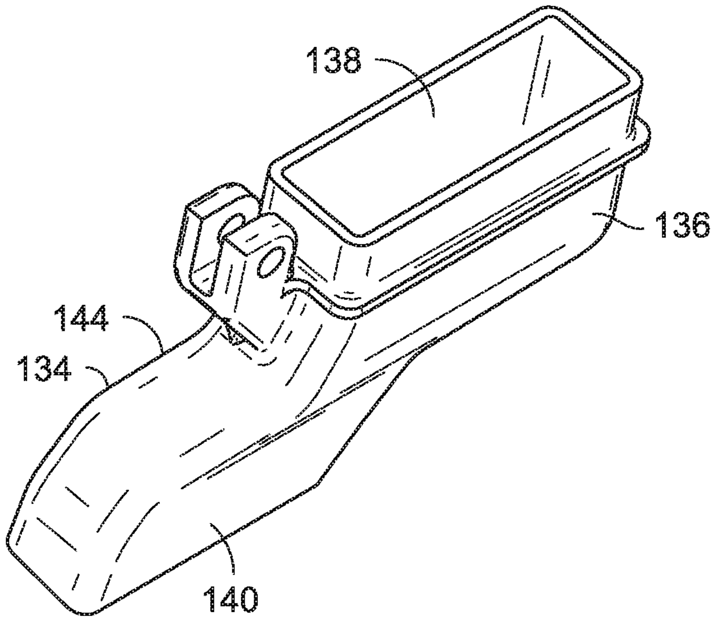
FIG. 6 is an isometric view of the duct illustrated in FIG. 5.
Figure 7:
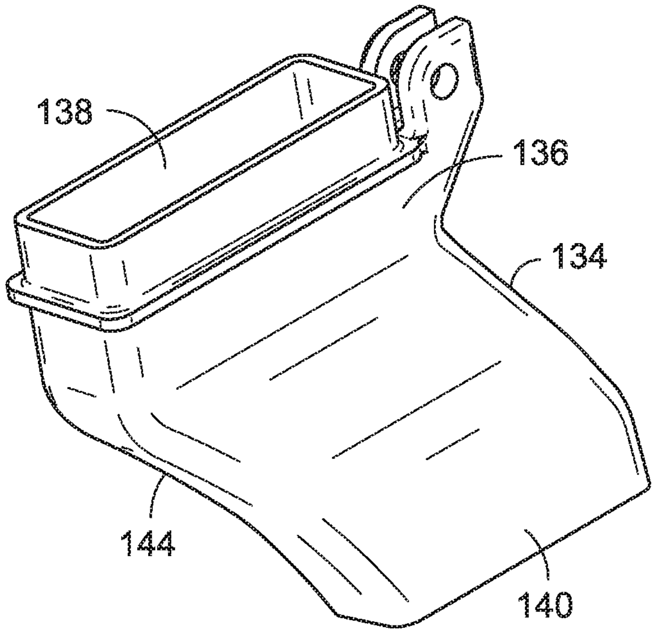
FIG. 7 is another isometric view of the duct illustrated in FIG. 5.
Figure 8:
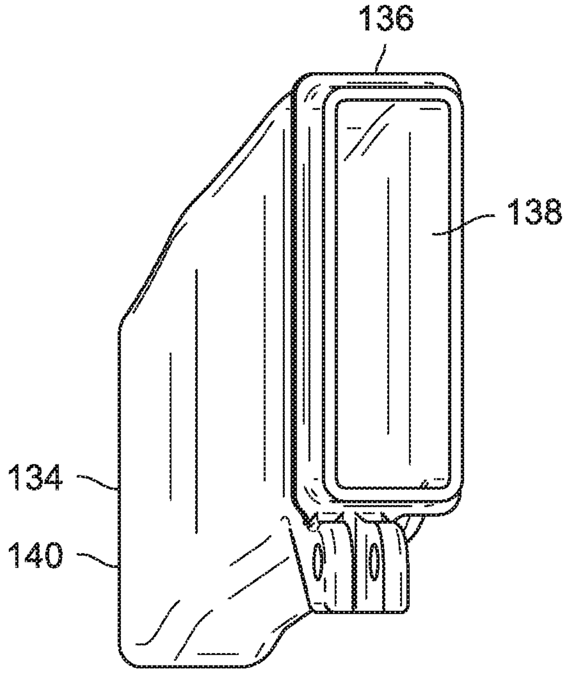
FIG. 8 is a top plan view of the duct illustrated in FIG. 5.
Figure 9:
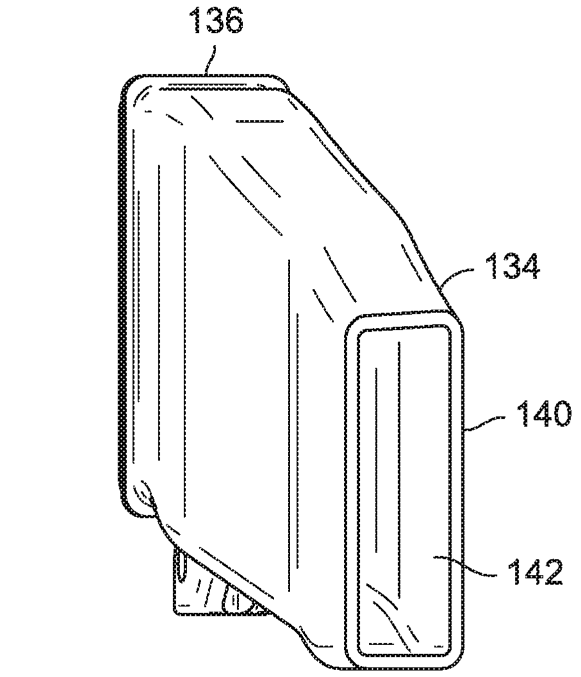
FIG. 9 is a bottom plan view of the duct illustrated in FIG. 5.
Figure 10:
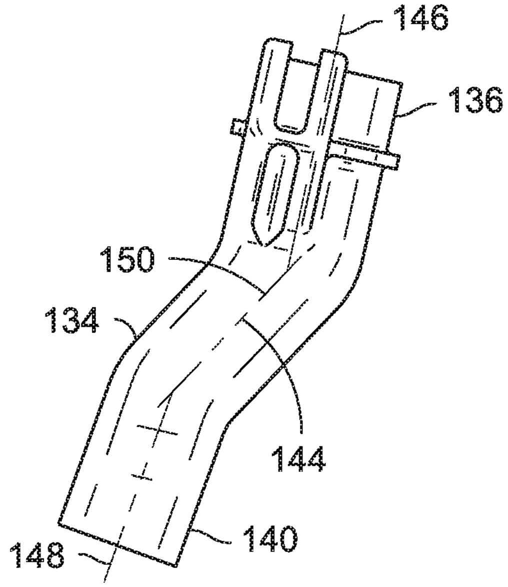
FIG. 10 is a right side view of the duct illustrated in FIG. 5.
Figure 11:
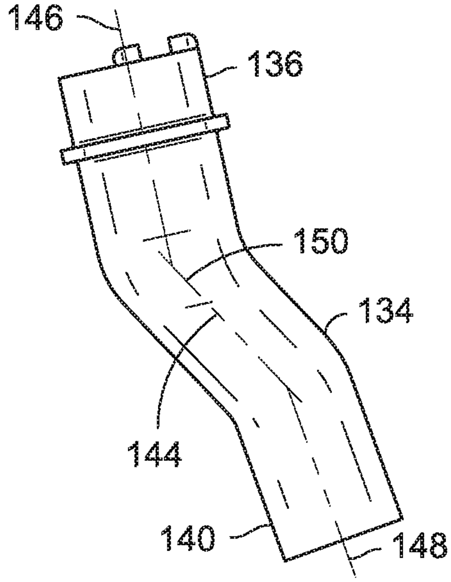
FIG. 11 is a left side view of the duct illustrated in FIG. 5.

In embodiments of the disclosure, the power tool 100 includes one or more apertures, slots, or vents 154 defined proximate to the end and/or one or more sides of the handle enclosure 118 of the housing assembly 112 (e.g., as described with reference to FIG. 3). In this manner, air from the duct 134 blown over and around the circuitry 108 can exit the housing assembly 112. It should also be noted that the housing assembly 112 may be leaky, in the sense that it is not tightly sealed and/or air can escape at other various points of the housing assembly 112, such as around the trigger and/or through seems between pieces of the shell that forms the housing assembly 112.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A power tool comprising an electrically powerable drive unit;

circuitry for controlling a supply of electrical energy to the electrically powerable drive unit;

a housing assembly including:

a generally longitudinal enclosure with a first interior volume for containing the electrically powerable drive unit, and a handle enclosure with a second interior volume for containing the circuitry, the handle enclosure extending generally perpendicularly with respect to the generally longitudinal enclosure proximate to a first end of the generally longitudinal enclosure, the second interior volume of the handle enclosure in fluid communication with the first interior volume of the generally longitudinal enclosure;

an air mover disposed within the housing assembly at the first end of the generally longitudinal enclosure proximate to the handle enclosure, the air mover configured to direct air from outside of the housing assembly at the first end of the housing assembly into the housing assembly, and then to direct the air generally perpendicularly to a longitudinally extending direction of the generally longitudinal enclosure; and a duct adjacent to and in fluid communication with the air mover at the first end of the generally longitudinal enclosure to direct the air from the air mover into the handle enclosure and toward the circuitry, the duct including:

an inflow segment having a first axis and defining a first area for receiving the air from the air mover, an outflow segment having a second axis and defining a second area for directing the air from the air mover toward the circuitry, and a connecting segment connecting the inflow segment to the outflow segment, the first area of the inflow segment axially offset from the second area of the outflow segment by the connecting segment, the first axis of the inflow segment and the second axis of the outflow segment each extending generally parallel to one another and generally perpendicularly with respect to the generally longitudinal enclosure, wherein at least one of the first area of the inflow segment or the second area of the outflow segment is generally rectangular-shaped, and an axis of the connecting segment is angled with respect to an axis of the inflow segment and an axis of the outflow segment when viewed from both a first orientation facing a short side of the at least one rectangular-shaped area and from a second orientation facing a long side of the at least one rectangular-shaped area.

2. The power tool as recited in claim 1, wherein the second area of the outflow segment is less than the first area of the inflow segment.

3. The power tool as recited in claim 2, wherein a ratio of the second area of the outflow segment to the first area of the inflow segment is between one-half (0.5) and ninety-five one-hundredths (0.95).

4. The power tool as recited in claim 1, wherein the circuitry comprises a plurality of insulated gate field effect transistors.

5. The power tool as recited in claim 1, further comprising at least a first vent proximate to the first end of the generally longitudinal enclosure and at least a second vent proximate to an end of the handle enclosure.

* * * * *